United States Patent
Tajima et al.

(10) Patent No.: US 8,705,465 B2
(45) Date of Patent: Apr. 22, 2014

(54) CONNECTION PROCESSING METHOD IN WIRELESS COMMUNICATION SYSTEM, WIRELESS BASE STATION, AND WIRELESS TERMINAL

(75) Inventors: Yoshiharu Tajima, Kawasaki (JP); Kazuhisa Obuchi, Kawasaki (JP); Yoshinori Tanaka, Kawasaki (JP); Yoshihiro Kawasaki, Kawasaki (JP); Yoshiaki Ohta, Kawasaki (JP); Katsumasa Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 291 days.

(21) Appl. No.: 12/900,117

(22) Filed: Oct. 7, 2010

(65) Prior Publication Data

US 2011/0019633 A1    Jan. 27, 2011

Related U.S. Application Data

(63) Continuation of application No. PCT/JP2008/058202, filed on Apr. 28, 2008.

(51) Int. Cl.
*H04W 8/22* (2009.01)

(52) U.S. Cl.
USPC ............................ 370/329; 370/322; 370/348

(58) Field of Classification Search
USPC .......................................... 370/328, 329, 342
See application file for complete search history.

(56) References Cited

U.S. PATENT DOCUMENTS

| | | | |
|---|---|---|---|
| 5,537,414 | A | 7/1996 | Takiyasu et al. |
| 5,539,748 | A | 7/1996 | Raith |
| 6,760,877 | B1 | 7/2004 | Lappetelainen et al. |
| 2005/0002388 | A1 | 1/2005 | Gao |
| 2005/0026621 | A1 | 2/2005 | Febvre et al. |
| 2005/0053029 | A1* | 3/2005 | Lee et al. ............... 370/328 |
| 2005/0157692 | A1* | 7/2005 | Gerakoulis ............... 370/342 |
| 2005/0160217 | A1 | 7/2005 | Gonzalez et al. |
| 2006/0063544 | A1 | 3/2006 | Zhao et al. |
| 2006/0074732 | A1 | 4/2006 | Shukla et al. |
| 2006/0121916 | A1 | 6/2006 | Aborn et al. |
| 2006/0294112 | A1 | 12/2006 | Mandato et al. |
| 2007/0077935 | A1* | 4/2007 | Kloppel et al. ............... 455/450 |
| 2007/0274211 | A1 | 11/2007 | Tsubota |
| 2008/0043771 | A1 | 2/2008 | Cho et al. |

(Continued)

FOREIGN PATENT DOCUMENTS

| | | |
|---|---|---|
| CN | 1925441 | 3/2007 |
| CN | 101080096 | 11/2007 |

(Continued)

OTHER PUBLICATIONS

Korean Intellectual Property Office "Notice of Preliminary Rejection" issued for corresponding Korean Patent Application No. 10-2005-7022043, Dec. 23, 2011.

(Continued)

*Primary Examiner* — Man Phan
*Assistant Examiner* — Pamit Kaur
(74) *Attorney, Agent, or Firm* — Myers Wolin, LLC

(57) ABSTRACT

In a wireless communication system, a wireless base station, if rejecting a connection to a wireless terminal that makes a connection request in accordance with a first connection processing, controls to adopt a second connection processing different from the first connection processing in response to a subsequent connection request by the wireless terminal.

10 Claims, 18 Drawing Sheets

(56) References Cited

U.S. PATENT DOCUMENTS

| | | | |
|---|---|---|---|
| 2008/0259900 A1 | 10/2008 | Masuda | |
| 2008/0268850 A1* | 10/2008 | Narasimha et al. | 455/437 |
| 2010/0027484 A1 | 2/2010 | Imamura et al. | |

FOREIGN PATENT DOCUMENTS

| | | |
|---|---|---|
| CN | 101132360 | 2/2008 |
| CN | 101137239 | 3/2008 |
| EP | 1814270 | 8/2007 |
| EP | 1871049 | 12/2007 |
| JP | 06-077963 | 3/1994 |
| JP | 8-508630 | 9/1996 |
| JP | 11-252650 | 9/1999 |
| JP | 2000-269887 | 9/2000 |
| JP | 2003-500896 | 1/2003 |
| JP | 2005-507593 | 3/2005 |
| JP | 2005-507611 | 3/2005 |
| JP | 2005-507612 | 3/2005 |
| JP | 2006-504363 | 2/2006 |
| JP | 2006-107477 | 4/2006 |
| JP | 2007-134946 | 5/2007 |
| JP | 2007-518166 | 7/2007 |
| JP | 2008-17195 | 1/2008 |
| JP | 2008-48233 | 2/2008 |
| JP | 2008-507217 | 3/2008 |
| JP | 2008-187551 | 8/2008 |
| KR | 10-2005-0024085 | 3/2005 |
| WO | 00/70812 | 11/2000 |
| WO | 01/47299 | 6/2001 |
| WO | 03/038633 | 5/2003 |
| WO | 03/039086 | 5/2003 |
| WO | 03/039087 | 5/2003 |
| WO | 2006/016784 | 2/2006 |
| WO | 2008/041582 | 4/2008 |

OTHER PUBLICATIONS

Notification of Reasons for Refusal issued for corresponding Japanese Patent Application No. 2010-509964 mailed May 8, 2012 with English translation.

NEC; "Efficient allocation method for preamble signature"; Agenda Item: 7.4.4 Enhanced Uplink for CELL_FACH State in FDD; 3GPP TSG-RAN WG2#60; R2-074835; Jeju, Korea; Nov. 4-9, 2007.

Samsung; "Scheme for C-RNTI Assignment in RACH Message Two"; Agenda Item: 5.1.1.7; 3GPP TSG-RAN WG2#60bis; R2-080172; Sevilla, Spain; Jan. 14-18, 2008.

Motorola; "Load control of Non-contention based RACH"; Agenda Item: 5.1.1.7; 3GPP TSG-RAN WG2#60bis; R2-080421; Sevilla, Spain; Jan. 14-18, 2008.

NEC; "Message 4 and contention resolution at random access"; Agenda Item: 4.3.1, 5.1.1.7, 5.2.1.3; 3GPP TSG-RAN WG2#60bis; R2-080437; Sevilla, Spain; Jan. 14-18, 2008.

Extended European search report with the European search opinion issued for corresponding European Patent Application No. 11185156.4 dated Apr. 24, 2012.

Extended European search report with the European search opinion issued for corresponding European Patent Application No. 08752212.4 dated Apr. 24, 2012.

Extended European search report with the European search opinion issued for corresponding European Patent Application No. 11185158.0 dated Apr. 24, 2012.

First Notification of Office Action issued for corresponding Chinese Patent Application No. 200880128864.4, issued Nov. 29, 2012 with an English translation.

3GPP TS 36.300 V8.4.0; 3rd Generation Partnership Project; Technical Specification Group Radio Access Network; "Evolved Universal Terrestrial Radio Access (E-UTRA) and Evolved Universal Terrestrial Radio Access Network (E-UTRAN)"; Overall description; Stage 2; (Release 8); dated Mar. 2008.

3GPP TR 25.913 V7.3.0; 3rd Generation Partnership Project; Technical Specification Group Radio Access Network; "Requirements for Evolved UTRA (E-UTRA) and Evolved UTRAN (E-UTRAN)"; (Release 7); dated Mar. 2006.

China Mobile; "Overload handling for Non-contention based RACH"; Agenda Item: 5.1.1.6; Feb. 11-15, 2008; pp. 1-2; Meeting #61; R2-080751; 3GPP TSG-RAN WG2; Sorrento, Italy.

First Notification of Office Action issued for corresponding Chinese Patent Application No. 201110095264.6, issued Mar. 26, 2013, with English translation.

International Search Report for corresponding International Patent Application No. PCT/JP2008/058202, mailed Jun. 3, 2008.

* cited by examiner

CONNECTION PROCESSING METHOD IN WIRELESS COMMUNICATION SYSTEM, WIRELESS BASE STATION, AND WIRELESS TERMINAL

CROSS-REFERENCE TO RELATED APPLICATION

This application is a continuation Application of a PCT international application No. PCT/JP2008/058202 filed on Apr. 28, 2008 in Japan, the entire contents of which are incorporated by reference.

FIELD

The embodiments discussed herein are related to a connection processing method in a wireless communication system, a wireless base station, and a wireless terminal.

BACKGROUND

Currently, third-generation mobile communication services by means of the Code Division Multiple Access (CDMA) scheme have just introduced in wireless (mobile) communication systems, including wireless terminals (user terminals), such as cellular phones. Also, next-generation mobile communication technologies capable of providing even faster communications have been under development. The 3rd Generation Partnership Project (3GPP) is studying the Long Term Evolution (LTE), as one of such next-generation mobile communication technologies.

In a mobile communication system, as a preparation to a wireless base station (evolved Node B: eNB) and a user terminal (user equipment: UE) for initiating a communication with each other, a channel is provided for the UE to initiate a transmission to the eNB. The 3GPP refers this channel as a "random access channel (RACH)", and refers the procedure for initiating a communication through an RACH as a "random access (RA)".

An RACH contains minimal information, using which the eNB distinguishes UEs from each other which make transmissions. The RACH is used when initiating a communication, and individual channels (or shared channels) are used afterwards. Thus, the RACH can be shared among a plurality of UEs unless it is used by more than one UEs simultaneously. For this purpose, identifiers called "signatures" (preambles) "are provided to the RACH, such that the eNB can distinguish UEs from each other which make transmissions simultaneously on the RACH.

A UE make an RA, for example, upon an initial transmission (origination), in response to an incoming transmission from the eNB (generation of downlink (DL) data), upon handover, upon recovery from disconnection (resuming a disconnected communication). As used herein, a wireless link in the direction from the eNB to a UE is referred to as "downlink (DL)", and a wireless link in the opposite direction as "uplink (UL)".

There may be some cases wherein an eNB does not recognize some UEs upon an initial transmission or recovery from disconnection, for example, and no individual signatures that can be exclusively used are allocated to the UEs. Such UEs randomly select one of a plurality of (for example, 64) preset signatures for making an RA. Accordingly, a plurality of UEs may simultaneously make RAs using the same signature, although the possibility of such an event is low. Such an RA procedure is referred to as a "contention based random access procedure (contention based RA procedure).

In such a case, the eNB resolves the conflicted signature (select one of the competing UEs), and sends a response to the selected UE. Each UE determines that that UE is selected by the eNB whether a response is received from the eNB. The UE selected by the eNB continues the communication (RA procedure) with the eNB, makes settings for the wireless channel with the eNB, and so on. The UE that was not selected by the eNB tries to retry an RA after a predetermined time interval or otherwise.

Note that such a contention of a signature occurs while a UE makes a handover to switch between eNBs for connecting, the connection might be temporarily disconnected or sometimes a communication might be disconnected. For this purpose, the LTE proposes to allocate individual signatures in advance to each of UEs for making a handover. Such an RA procedure is referred to as "non-contention based random access procedure (non-contention based RA procedure)".

Non-Patent Document 1: 3GPP TR25.913 V7.3.0 (2006-03)
Non-Patent Document 2: 3GPP TS36.300 V8.4.0 (2008-03)

Even when a UE that makes a contention based RA is selected by the eNB as a UE to establish a connection, the UE may not be refused connection by the eNB. For example, the eNB may refuse or suspend a connection with a new UE when the communication traffic is high.

In such a case, although the UE can execute connection processing (RA) to the eNB, such as after a predetermined time interval, the eNB is not aware of which UE was selected in the previous RA procedure. Therefore, conventionally, even if a UE was selected by the eNB in the previous RA procedure, that UE can execute connection processing (RA) in the same priority (procedure) as those of other UEs that were not selected.

SUMMARY (1) According to an aspect of the embodiments, a method includes a connection processing method in a wireless communication system including wireless terminals and a wireless base station, the communication processing method including: the wireless base station, if rejecting a connection from a wireless terminal that makes a connection request in accordance with a first connection processing, controlling to adopt a second connection processing different from the first connection processing in response to a subsequent connection request by the wireless terminal.

(2) According to an aspect of the embodiments, an apparatus includes a wireless base station in a wireless communication system including wireless terminals and the wireless base station, the wireless base station including: a control section that, if rejecting a connection from a wireless terminal that makes a connection request in accordance with a first connection processing, controls to adopt a second connection processing different from the first connection processing in response to a subsequent connection request by the wireless terminal.

(3) According to an aspect of the embodiments, an apparatus includes a wireless terminal in a wireless communication system including wireless terminals and a wireless base station, the wireless terminal including: a control section that, if a connection is rejected by the wireless base station for a connection request in accordance with a first connection processing, is controlled by the wireless base station to apply a second connection processing different from the first connection processing upon making a subsequent connection request to the wireless base station.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereunder is a description of embodiments with reference to the drawings. Note that the embodiments that will be described are merely exemplary, and it is not intended to exclude various variations and applications of techniques that are not described. In other words, the present embodiments can be practiced in various ways (by combining examples, for example) without departing from the spirit thereof.

(1) First Embodiment

Figure 1:
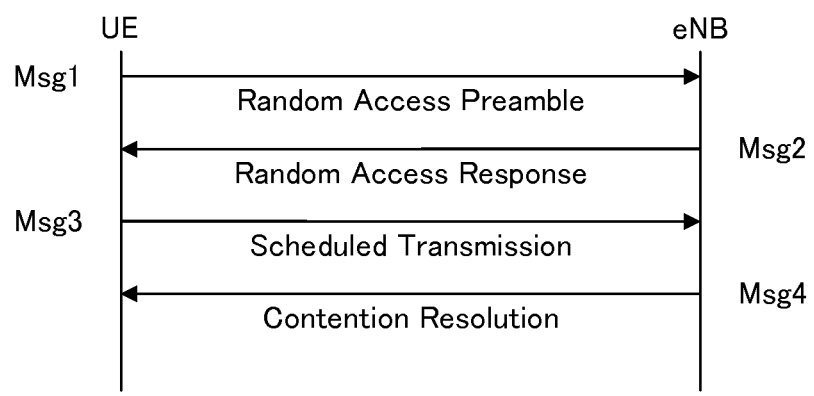
FIG. 1 is a sequence diagram illustrating one example of a contention based RA procedure.
Figure 2:
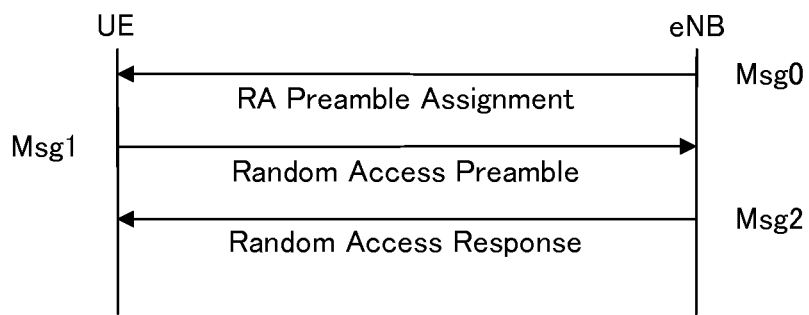
FIG. 2 is a sequence diagram illustrating one example of a non-contention based RA procedure.

Here, the above-described contention based and non-contention based RA procedures will be described with reference to FIGS. 1 and 2. FIGS. 1 and 2 depict examples of contention based RA and non-contention based RA procedures, respectively.

(1.1) Contention-Based RA Procedure

In the contention based RA procedure illustrated in FIG. 1, a UE randomly selects a signature to be used from a plurality of signatures supplied in advance, and sends a message (Msg1: RA preamble) containing the selected signature to an eNB through an RACH.

In response to receiving the RA preamble (signature) sent from the UE, the eNB sends a corresponding RA response (Msg2). This RA response may be sent using a shared DL channel, for example. In this RA response, may be also contained include one or more signatures which have been received (identified) by the eNB, transmission grants for the shared UL channel corresponding to the signatures, and an identifier temporarily allocated for identifying a destination (UE) in subsequent RA communications. This identifier is referred to as a "temporary-connection radio network temporary identifier (T-CRNTI)".

In response to receiving the RA response (Msg2) from the eNB, the UE checks whether or not the signature that was sent in the RA preamble (Msg1) is contained in the received information. When it is contained, the UE sends (scheduled transmission) a UL message (Msg3) based on the transmission grant that is contained in the RA response and corresponds to the signature which the UE sent. In this message (Msg3), contained may be a temporary mobile subscriber identity (TMSI) as one example of the identification number of the UE, and the like.

Since the UE uses the randomly selected signature in the RA preamble (Msg1), more than one UEs may simultaneously attempt to send RA preambles (Msg1) to the eNB using the same signature.

In such a case, although the eNB cannot distinguish the UEs from each other, the eNB can resolve the contention by identifying the UEs 20 causing the contention by using received identification numbers (TMSIs) sent from the UEs in the scheduled transmission (Msg3). The eNB selects a UE during the contention resolution, and sends a response (Msg4) to the selected UE. This response (Msg4) is refereed to as a "contention resolution".

In response to receiving this response (Msg4), the UE continues the communication with the eNB. The UE uses the T-CRNTI described above as a cell-RNTI (C-RNTI) in subsequent communications. The UE that was not selected by the eNB and thus received no Msg4 makes an RA procedure as described above from the beginning (i.e., resends a Msg1).

(1.2) Non-Contention Based RA Procedure

In contrast, in a non-contention based RA procedure illustrated in FIG. 2, UEs do not randomly select signatures, but the eNB selects individual signatures for the UEs, and notifies (allocations) the UE of the individual signatures in advance (Msg0: random access (RA) preamble assignment).

A UE makes an RA to the eNB using the individual signature allocated by eNB using this notification (Msg0). More specifically, through an RACH, the UE sends a message (Msg1: RA preamble) containing the individual signature allocated in advance to the eNB.

In response to receiving the RA preamble (Msg1) from the UE, the eNB sends a RA response (Msg2) to that RA preamble, together with a synchronization signal for UL communications and a UL transmission grant corresponding to the individual signature.

As set forth above, signatures used for sending RA preambles have been allocated to the UEs in advance in a non-contention based RA procedure, the UEs can establish connections with the eNB more quickly than in a contention based RA procedure. As long as the eNB is aware of which UEs are present (i.e., manages the UEs), a non-contention based RA procedure can be employed since the eNB can initiate an RA procedure, starting from transmission to a UE.

In a contention based RA procedure as illustrated in FIG. 1, even when the eNB selects a UE as a party to establish a connection, that UE cannot establish a connection with the eNB for some reason of the eNB. One example of such cases is when congestion occurs in the eNB.

In such a case, the eNB notifies the UE of a message referred to as "radio resource control (RRC) connection reject" as the above-described Msg4, informing that the connection is refused (is rejected or suspended). Information related to when an RA is to be retried (waiting time duration) may be contained in this message.

Thus, a UE receiving the RRC connection reject (Msg4) can execute the RA after that waiting time duration expires. The UE could not make a connection for the reason of the eNB despite the UE was selected by the eNB 10. Thus, if the UE has to makes an RA (connection processing) (retries it from the beginning) under the same condition as those of other non-selected UEs, it seems unfair.

Accordingly, in this example, after a UE makes a connection request to an eNB in accordance with a contention based RA procedure as one example of a first connection processing (scheme) and is refused for a connection, a control is made to adopt a second connection processing (scheme) that is different from the first connection processing (scheme) when the UE makes a subsequent connection request to the eNB.

For example, when the eNB notifies a UE which the eNB has identified of rejection or suspension of a connection, the eNB notifies (allocation) the UE of information (preference information), using which the UE can obtain preferential connection control. One example of such preference information includes flag information of one or several bites, an individual signature, a UL transmission grant, allocation information of a UL wireless resource, and time (timing) information. The UE executes connection processing (RA) based on the preference information received from the eNB. In other words, the UE obtains the preferential connection control from the eNB when the UE is notified (allocation) of the preference information.

More specifically, after the eNB 10 refuses a connection request from a UE 20 based on a random signature as one example of first information, the eNB 10 allocates preference information as described above to that UE 20 as one example of second information, in response to a subsequent transmission from that UE 20 to the eNB 10. The possibility of a connection being granted in a connection procedure using the preference information is increased than in the procedure using a random signature. The UE 20 makes transmissions to the eNB 10 based on the allocated second information. Furthermore, since the second information causes fewer contentions with other UEs 20 than the first information, it is possible to adopt a connection procedure that has a higher possibility of a connections being granted.

Thus, when a UE executes connection processing (RA) after the UE was refused for a connection by the eNB, that UE can establish a connection with the eNB earlier than other UEs. Accordingly, it is possible to reduce connection delays or occurrence of disconnections.

Hereinafter, specific examples will be described with reference to FIGS. 3-6.

(1.3) Example of System Configuration

Figure 3:
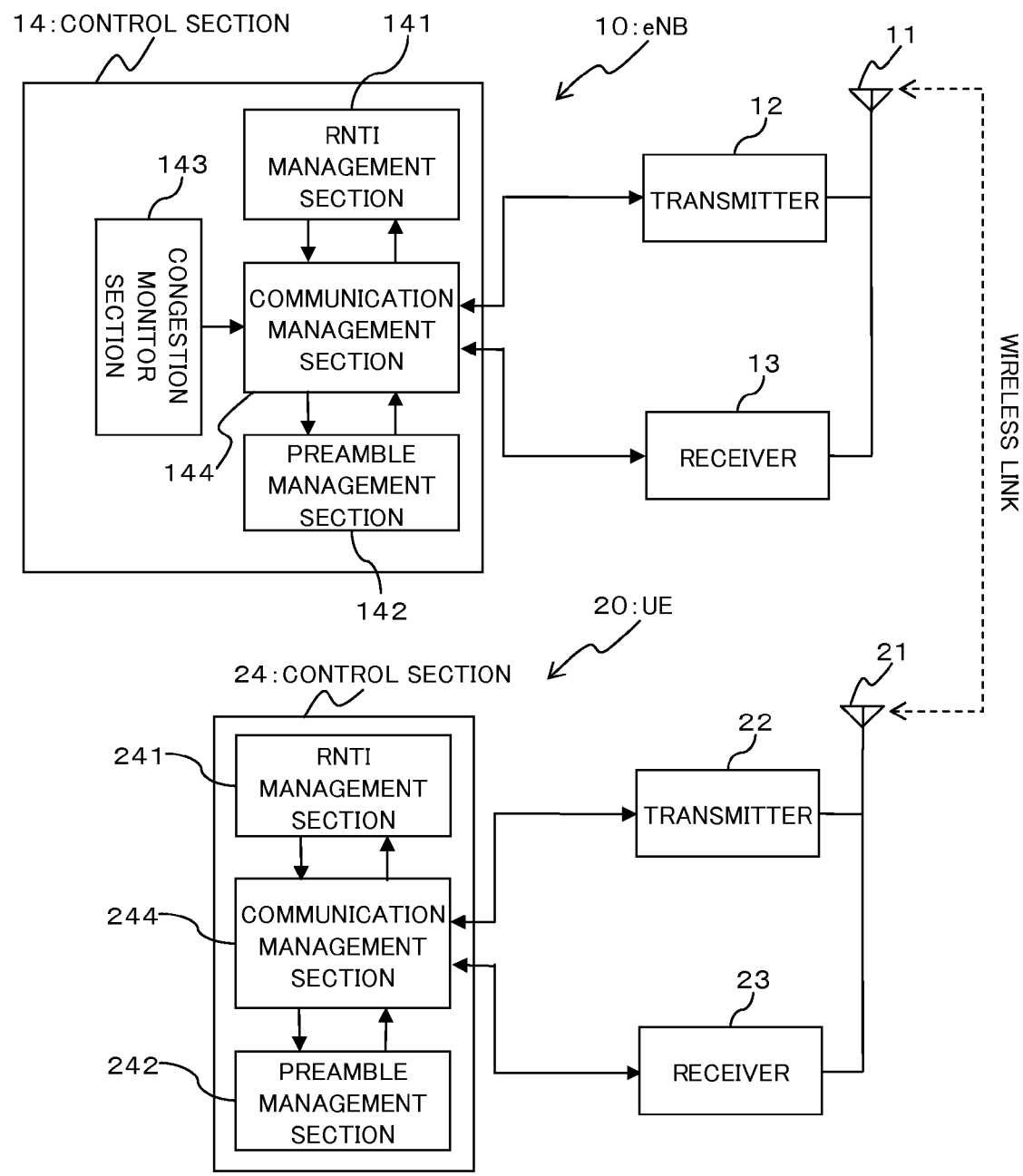
FIG. 3 is a block diagram illustrating one example of a wireless (mobile) communication system in a first embodiment.

FIG. 3 is a block diagram illustrating one example of a wireless (mobile) communication system in accordance with a first embodiment. The system depicted in FIG. 3 includes an eNB 10 as one example of a wireless base station, and a UE 20 that may communicate with the eNB 10 via a wireless link in a wireless area of the eNB 10, as one example of a wireless terminal (user terminal).

Although one eNB 10 and one UE 20 are illustrated in FIG. 3, a plurality of eNBs 10 and UEs 20 may be present in this wireless communication system. The wireless link includes DL and UL wireless channels. Each of the DL and UL wireless channels may include a shared channel shared by multiple UEs and individual channels exclusively used by the respective UEs.

In addition, the same configurations of the eNB 10 and the UE 20 depicted in FIG. 3 may be used in second to seventh embodiments that will be described below. Furthermore, the wireless base station 10 in this example is considered as an eNB of the LTE having a some or all of the functions of a radio network controller (RNC), the wireless base station 10 may be any other base station in older generations than the LTE (without the functions of the RNC). Additionally, the wireless base station 10 may be a base station in any other systems as long as the system supports RA procedures employing signatures.

(Description of eNB)

The eNB 10 may include a transmission and reception antenna 11, a transmitter 12, a receiver 13, and a control section 14, for example.

The transmission and reception antenna 11 (hereinafter, it may be simply referred to as "antenna 11") sends a DL wireless signal which in turn may be received by the UE 20 located within a wireless area (cell or sector) serviced by the eNB 10, as well as receiving a UL wireless signal sent by the UE 20.

The transmitter 12 executes predetermined transmission processing on transmission data addressed to the UE 20 (including user data, control data, and the like) to generate a wireless channel signal, and outputs the signal to the transmission and reception antenna 11. Examples of the transmission processing may include encoding of the DL transmission data, modulation of the encoded data, mapping of the modulated signal to a frame in a predetermined channel, frequency conversion (upconversion) of the frame signal into a wireless frequency, power amplification of the wireless frame. The wireless frame may be a wireless frame based on the Orthogonal Frequency Division Multiplexing (OFDM) or Orthogonal Frequency Division Multiple Access (OFDMA), for example.

The receiver 13 executes predetermined reception processing on a UL wireless signal (wireless frame) received by the antenna 11 to obtain UL data (including user data, control data, and the like) sent by the UE 20. Examples of the reception processing may include low-noise amplification of the received signal, frequency conversion (downconversion) to the baseband frequency, gain adjustment, demodulation, and decoding.

The control section 14 controls the transmission processing in the transmitter 12 and the reception processing in the receiver 13. Through this control, the timing when messages used for the above-described RA procedure are sent or received is controlled. For this purpose, the control section 14 may include an RNTI management section 141, a preamble management section 142, a congestion monitor section 143, and communication management section 144, for example.

The RNTI management section 141 manages an RNTI, as one example of the identification information of UEs 20, for each UE 20. This management includes allocation and deallocation of signatures to and from UEs 20. The RNTI includes a T-CRNTI and a C-RNTI.

The preamble management section 142 manages RA preambles (signatures) used in RA procedures with UEs 20. In the LTE, 6-bit signatures (64 different signatures) are available, which are shared between the two types of RA procedures (contention based RA procedure and non-contention based RA procedure). The signatures randomly selected for use by UEs 20 in a contention based RA procedure are referred to as "random signatures", while signatures selected by the eNB 10 and allocated to UEs 20 in a non-contention based RA procedure are referred to as "individual signatures". Since the random signatures are information selected by UEs 20, contention of a random signature with another UE 20 may occur. On the other hand, the individual signatures are individual information allocated to each UE 20 in advance by the eNB 10 that is aware of which UEs 20 are present, and thus the individual information is specific to the respective UEs 20, and does not conflict with individual information of other UEs 20.

The congestion monitor section 143 monitors whether or nor congestion occurs by monitoring the communication traffic load of the eNB 10. In response to detecting congestion, the congestion monitor section 143 notifies the communication management section 144 that the congestion occurs.

The communication management section 144 controls the transmission processing in the transmitter 12 and the reception processing in the receiver 13, in cooperation with the RNTI management section 141, the preamble management section 142, and the congestion monitor section 143. For example, the communication management section 144 makes transmission and reception (generation, extraction) of a message containing an RNTI, in cooperation with the RNTI management section 141, or makes transmission and reception (generation, extraction) of a message containing a signature, in cooperation with the preamble management section 142.

In addition, the communication management section 144 generates, in response to congestion being detected by the congestion monitor section 143, a message (RRC connection reject) indicating a connection being rejected or suspended to the UE 20, which was selected as a party to establish a connection, during the RA procedure and notifies the UE 20 of the message. At that time, the communication management section 144 can additionally notify information (preference information) indicating that the selected UE 20 can obtain a preferential connection control. Thereby, when a UE 20 makes connection request after the UE 20 was refused for a connection by the eNB, it is possible to control to adopt the second connection processing that is different from the previous connection processing.

Note that the communication management section 144 additionally manages a wireless resource used for communications with the UE 20 (including communications during an RA). For example, the communication management section 144 manages UL and DL wireless resources used in communications with the UE 20, such as the channel frequency, time (transmission and reception timing), and allocation thereof. When a format for the OFDMA scheme is adopted for a wireless frame, the management of the wireless resource includes management of placement (mapping) of two-dimensional transmission and reception regions (referred to as "bursts") defined by subchannel frequencies and symbol times.

(Description of UE)

In contrast, the UE 20 may include a transmission and reception antenna 21, a transmitter 22, a receiver 23, and a control section 24, for example.

The transmission and reception antenna 21 (hereinafter, it may be simply referred to as "antenna 21") receives a DL wireless signal sent by the eNB 10 in a wireless area (cell or sector) serviced by the eNB 10, as well as sending UL wireless signal directed to the eNB 10.

The transmitter 22 executes predetermined transmission processing on transmission data addressed to the eNB 10 (including user data, control data, and the like) to generate a wireless channel signal, and outputs the signal to the transmission and reception antenna 21. Examples of the transmission processing may include encoding of the UL transmission data, modulation of the encoded data, mapping of the modulated signal to a frame in a predetermined channel, frequency conversion (upconversion) of the frame signal into a wireless frequency, power amplification of the wireless frame.

The receiver 23 executes predetermined reception processing on a DL wireless signal (wireless frame) received by the antenna 21 to obtain DL data (including user data, control data, and the like) sent by the eNB 10. Examples of the reception processing may include low-noise amplification of the received signal, frequency conversion (downconversion) to the baseband frequency, gain adjustment, demodulation, and decoding.

The control section 24 controls the transmission processing in the transmitter 22 and the reception processing in the receiver 23. Through this control, the timing when messages used for the above-described RA procedure are sent or received is controlled. For this purpose, the control section 24 may include an RNTI management section 241, a preamble management section 242, and communication management section 244, for example.

Te RNTI management section 241 manages an RNTI as one example of identification information of the local terminal (UE 20). The RNTI includes a T-CRNTI and a C-RNTI.

The preamble management section 242 manages random access preambles (signatures) used in RA procedures with the UE 20. The signatures include random signatures that are randomly selected for use by UEs 20 in a contention based RA procedure, and individual signatures that are notified (allocated) by the eNB 10 in advance.

The communication management section 244 controls the transmission processing in the transmitter 22 and the reception processing in the receiver 23, in cooperation with the RNTI management section 241 and the preamble management section 242. For example, the communication management section 244 makes transmission and reception (generation, extraction) of a message containing an RNTI, in cooperation with the RNTI management section 241, or makes transmission and reception (generation, extraction) of a message containing a signature, in cooperation with the preamble management section 242.

After preference information as described above is notified together with a message (RRC connection reject) indicating a connection being rejected or suspended, the communication management section 144 makes an RA to the eNB 10 based on the preference information. Thereby, even if the UE 20 is refused a connection in the first RA, the UE 20 is preferentially treated by the eNB 10 in a subsequent second RA.

Note that the communication management section 244 additionally manages a wireless resource used for communications with the eNB 10 (including communications during an RA). For example, the communication management section 244 manages UL and DL wireless resources, such as the channel frequency and time (transmission and reception timing) allocated by the eNB 10. When a format for the OFDMA scheme is adopted for a wireless frame, the management of the wireless resource includes management of placement (mapping) of two-dimensional transmission and reception regions (bursts) defined by subchannel frequencies and symbol times.

(Description of Operation)

Figure 4:
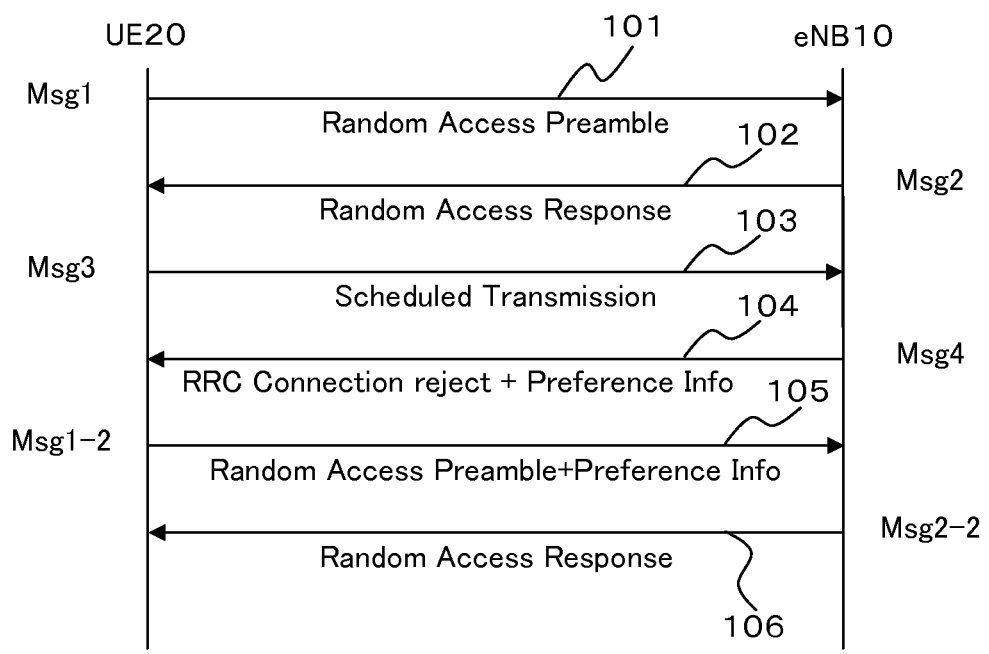
FIG. 4 is a sequence diagram illustrating one example of the operation (RA procedure) taken by the wireless communication system in the first embodiment.

Hereinafter, operation (RA procedure) of a wireless communication system (an eNB 10 and a UE 20) in this example, as configured as described above, will be described with reference to FIGS. 4-6. Note that FIG. 4 is a sequence diagram illustrating one example of an RA procedure between an eNB 10 and a UE 20, FIG. 5 is a sequence diagram illustrating one example of the RA procedure taken by the eNB 10, and FIG. 6 is a sequence diagram illustrating one example of the RA procedure taken by the UE 20.

The UE 20 executes a contention based RA procedure upon an initial transmission or recovery after disconnection. More specifically, the UE 20 (the communication management section 244) randomly selects a signature to be used from a plurality of signatures managed by the preamble management section 242, and sends the selected signature as an RA preamble (Msg1) to the eNB 10 through an RACH (Processing 101 in FIG. 4 and Processing 2010 in FIG. 6).

Figure 5:
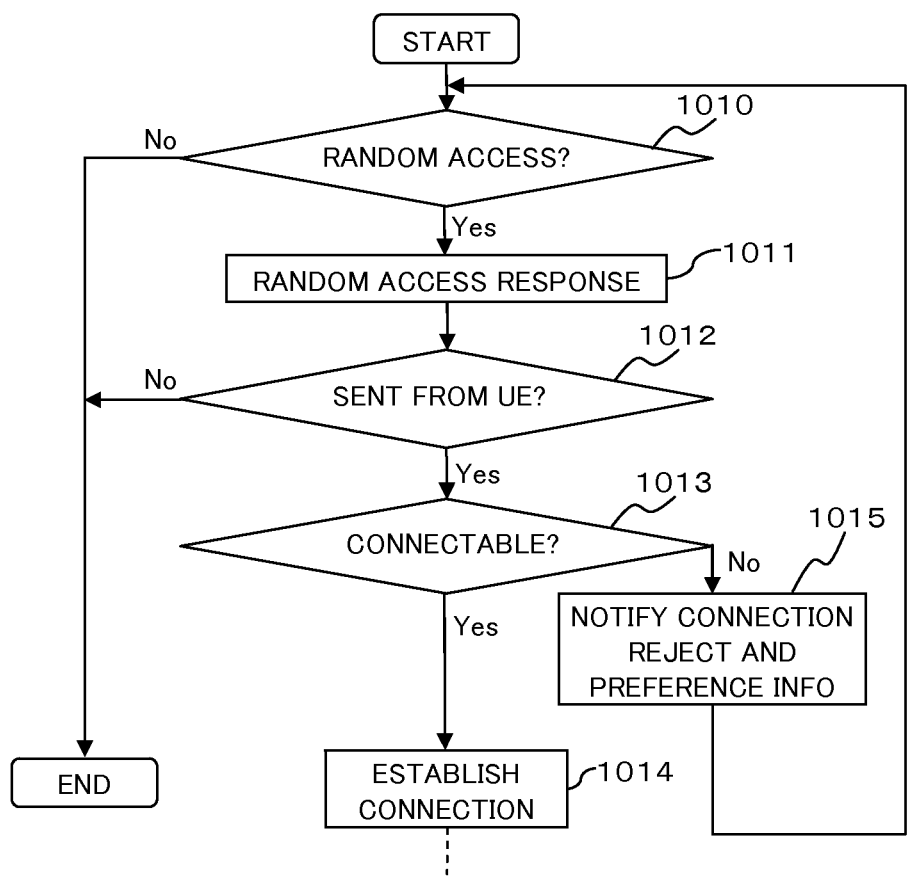
FIG. 5 is a flowchart illustrating one example of an RA procedure taken by a wireless base station (eNB) in the first embodiment.
Figure 6:
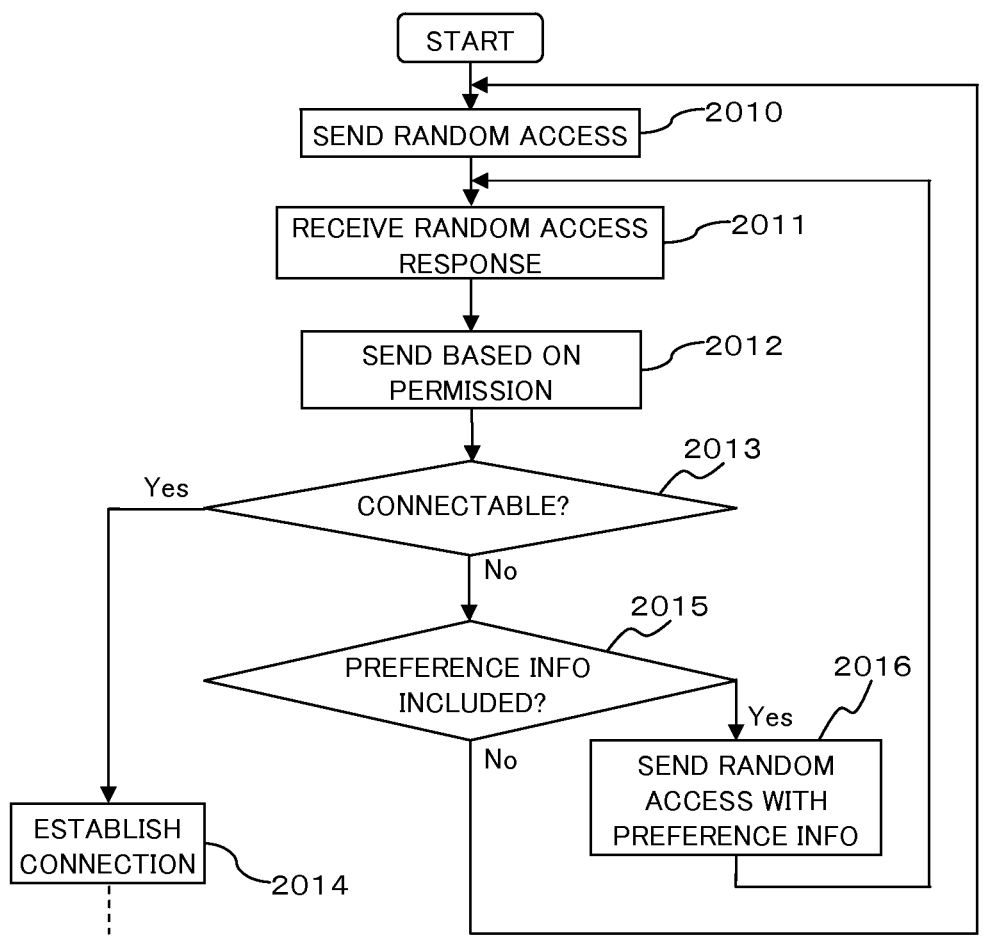
FIG. 6 is a flowchart illustrating one example of an RA procedure taken by a wireless terminal (UE) in the first embodiment.

On the other hand, the eNB 10 (the communication management section 144) is periodically monitoring whether any RA preamble (Msg1) sent by the UE 20 is received (No route from Processing 1010 in FIG. 5). Once a reception of an RA preamble (Msg1) is identified (Yes route from Processing 1010 in FIG. 5), the eNB 10 (communication management section 144) generates an RA response (Msg2) for the received RA preamble (Msg1), and sends the response (Processing 102 in FIG. 4 and Processing 1011 in FIG. 5).

As set forth above, this RA response (Msg2) is sent using a shared DL channel, for example. In this RA response, one or more signatures that the eNB 10 (the communication management section 144) could identify, transmission grants for the shared UL channel corresponding to the signatures, and an identifier (T-CRNTI) temporarily allocated for identifying a destination (UE) in subsequent RA communications may be contained.

In response to receiving the RA response (Msg2) from the eNB 10 (Processing 2011 in FIG. 6), the UE 20 (the communication management section 244) checks whether or not the signature that was sent in the RA preamble (Msg1) is contained in the received information. When it is contained, the UE 20 (the communication management section 244) sends (scheduled transmission) a UL message (Msg3) based on the transmission grant that is contained in the RA response and corresponds to the signature which the UE 20 sent (Processing 103 in FIG. 4 and Processing 2012 in FIG. 6). In this message (Msg3), contained may be a TMSI, as one example of the identification number of the UE 20, and the like.

After sending the RA response (Msg2), the eNB 10 (the communication management section 144) monitors whether or not there is any transmission (whether any Msg3 is received) from the UE 20 based on the transmission grant (No route from Processing 1012 in FIG. 5). If a reception of an Msg3 is identified (Yes route from Processing 1012 in FIG. 5), the eNB 10 (the communication management section 144) checks whether or not a connection can be made (a link can be established) with the UE 20 indicated by the TMSI included in this Msg3 (Processing 1013 in FIG. 5).

As an example, when the congestion monitor section 143 determines that no congestion occurs, the eNB 10 (the communication management section 144) determines that a connection can be made and sends a response (Msg4: Contention Resolution) for the Msg3 to the UE 20.

In response to receiving this response (Msg4), the UE 20 continues the communication with the eNB 10. The UE uses the T-CRNTI described above as a cell-RNTI (C-RNTI) in subsequent communications. Thereby, a connection between the eNB 10 and the UE 20 is established (Yes route from Processing 1013 through Processing 1014 in FIG. 5; and Yes route from Processing 2013 through Processing 2014 in FIG. 6).

On the other hand, if the eNB 10 (the congestion monitor section 143) recognizes occurrence of congestion, the eNB 10 (the communication management section 144) determines that a connection cannot be made and sends (notification) an RRC connection reject message (Msg4) attached with preference information to that UE 20 (Processing 104 in FIG. 4 and Processing 1015 in FIG. 5).

In response to receiving the Msg4, the UE 20 (the communication management section 244) checks whether or not preference information is attached to the Msg4 (Processing 2015 in FIG. 6). If preference information is attached (Yes route from Processing 2015 in FIG. 6), the UE 20 (the communication management section 244) makes a contention based RA again by attaching the preference information to a message (Msg1-2) equivalent to an RA preamble (Msg1) and sending the message to the eNB 10 (Processing 105 in FIG. 4 and Processing 2016 in FIG. 6).

In response to receiving the RA preamble from the UE 20, if the preference information is attached to the received RA preamble, the eNB 10 (the communication management section 144) is aware that the UE 20 that sent the message is the particular UE 20 that was identified previously but a connection therewith was rejected or suspended. In a sense, the RA preamble attached with preference information is information unique to that UE 20. Accordingly, the possibility of contention of the RA preamble with other UEs 20 is reduced, and the UE becomes more probable to be selected as a UE 20 which the eNB 10 gives permission.

The eNB 10 (the communication management section 144) identifies that UE 20 as a UE 20 to give a preferential connection control (to control to adopt a second RA different from a first RA). The eNB 10 (the communication management section 144) sends a message (Msg2-2) equivalent to an RA response (Msg2) to preferentially to the UE 20 that sent the RA preamble (Msg1) without attaching preference information (Processing 106 in FIG. 4).

As set forth above, in accordance with this example, in an RA in accordance with a contention based RA procedure, a UE that was identified by the eNB 10 but a connection therewith was rejected or suspended for some reason of the eNB 10 can be preferentially treated (connection control) upon making a subsequent RA. Accordingly, the time to initiate a communication (establish a connection) can be reduced.

(2) Second Embodiment

In the above-described embodiment, in the contention based RA procedure, the eNB 10 (the communication management section 144) notifies the UE 20 of preference information upon notifying a message (Msg4: RRC connection reject) indicating a connection being rejected or suspended. In contrast, in this example, as illustrated in FIG. 7, the eNB 10 (the communication management section 144) notifies a UE 20 of an individual signature, as another example of preference information (Processing 1025).

Figure 8:
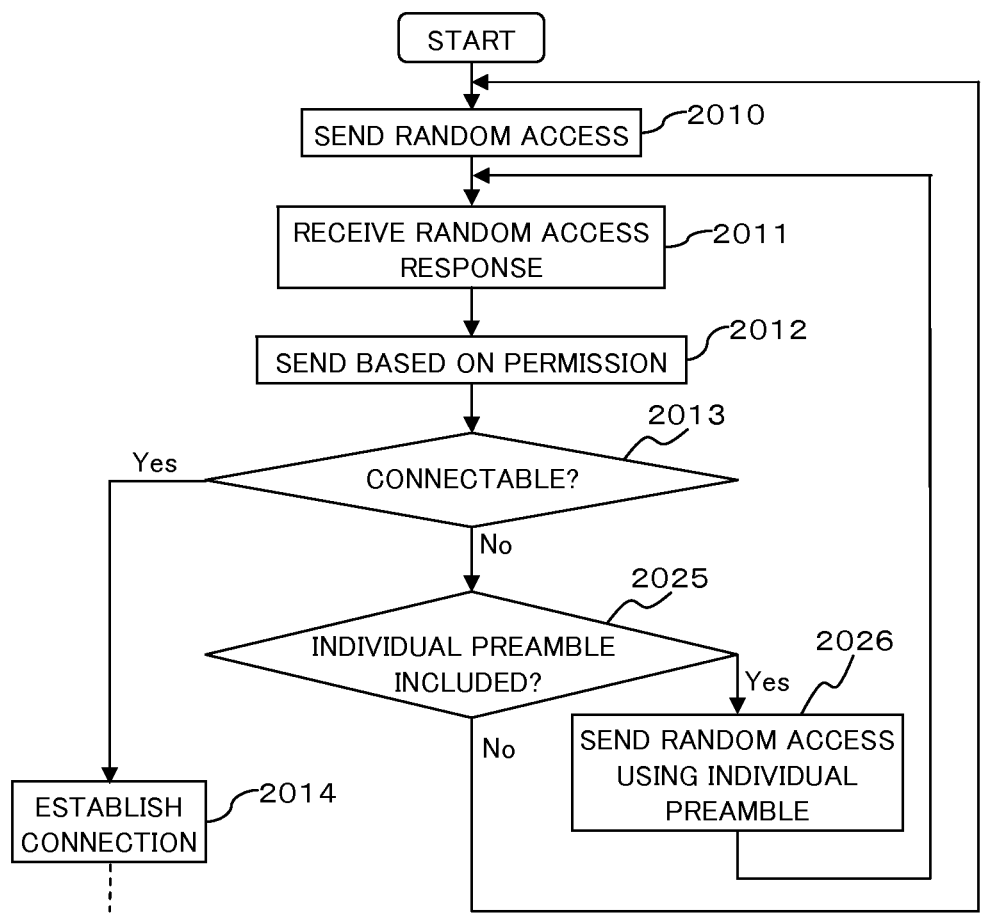
FIG. 8 is a flowchart illustrating one example of an RA procedure taken by a UE in the second embodiment.

In response to receiving an Msg4, if an individual signature is attached to the Msg4, the UE 20 (the communication management section 244) sends an RA preamble (Msg1) containing this individual signature to the eNB 10 upon retrying an RA (Yes route from Processing 2025 to Processing 2026 in FIG. 8). In other words, the UE 20 can use a non-contention based RA procedure as illustrated in FIG. 2 upon retrying an RA.

Accordingly, since the possibility for that UE 20 to experience a contention of the RA preamble with other UE 20s is reduced as compared to other UEs 20 executing a contention based RA procedure from the beginning, the UE 20 can be more preferentially recognized and treated (connection control) by the eNB 10 (the communication management section 144).

Figure 7:
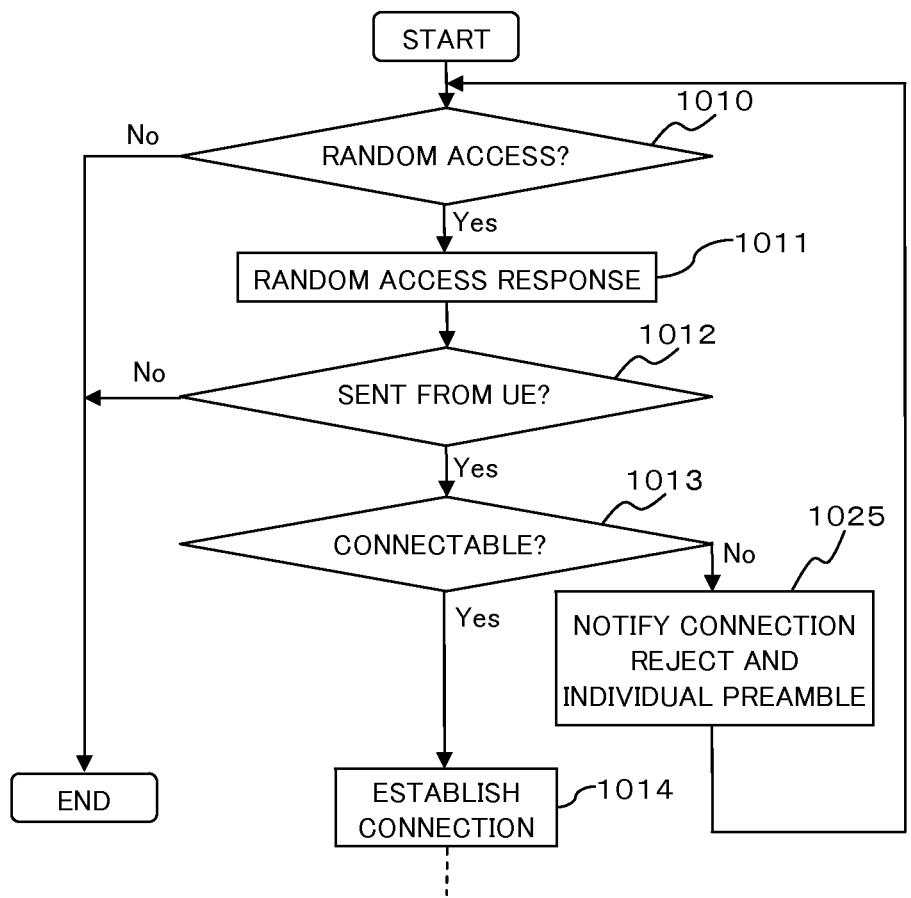
FIG. 7 is a flowchart illustrating one example of an RA procedure taken by an eNB in a second embodiment.

Note that Processing 1010 through Processing 1014 executed by the eNB 10 (the communication management section 144) illustrated in FIG. 7 is equivalent to Processing 1010 through 1014 illustrated in FIG. 5. In addition, Processing 2010 through Processing 2014 executed by the UE 20 (the communication management section 244) illustrated in FIG. 8 is equivalent to Processing 2010 through 2014 illustrated in FIG. 6.

(3) Third Embodiment

As set forth above, the eNB 10 allocates an identifier known as a C-RNTI to a UE 20 as one example of an identifier for use in communications after a connection is established. This allocation is done using an Msg4 (Contention Resolution) that is send by the eNB 10 to a UE 20 which the eNB 10 could identify.

In this example, a C-RNTI can also be allocated when the eNB 10 notifies a UE 20 of an Msg4 (RRC connection reject) indicating a connection being rejected or suspended. This can help to reduce the time to initiate a communication (establish a connection) since reallocation of a C-RNTI to that UE 20 may be no more required upon retrying an RA.

For this purpose, a temporary identifier (T-CRNTI) that is notified from the eNB 10 to the UE 20 in a RA response (Msg2) in a contention based RA procedure may be used, for example. More specifically, the eNB 10 maintains a T-CRNTI notified to the UE 20 in an RA response (Msg2) and an individual signature notified to the UE 20 in an Msg4 (RRC connection reject) in the second embodiment in the relation in the RNTI management section 141, while relating them to each other. On the other hand, the UE 20 maintains a T-CRNTI notified by the eNB 10 and the individual signature in the RNTI management section 241, while relating them to each other.

Thereby, when retrying an RA in a non-contention based RA procedure (when sending an individual signature to the eNB 10 as an RA preamble), the UE 20 can use the related T-CRNTI as a C-RNTI in a communication with the eNB 10 after a connection is established. Accordingly, no additional reallocation of a C-RNTI (T-CRNTI) from the eNB 10 to the UE 20 may be required, and the time to initiate a communication can be reduced.

Figure 9:
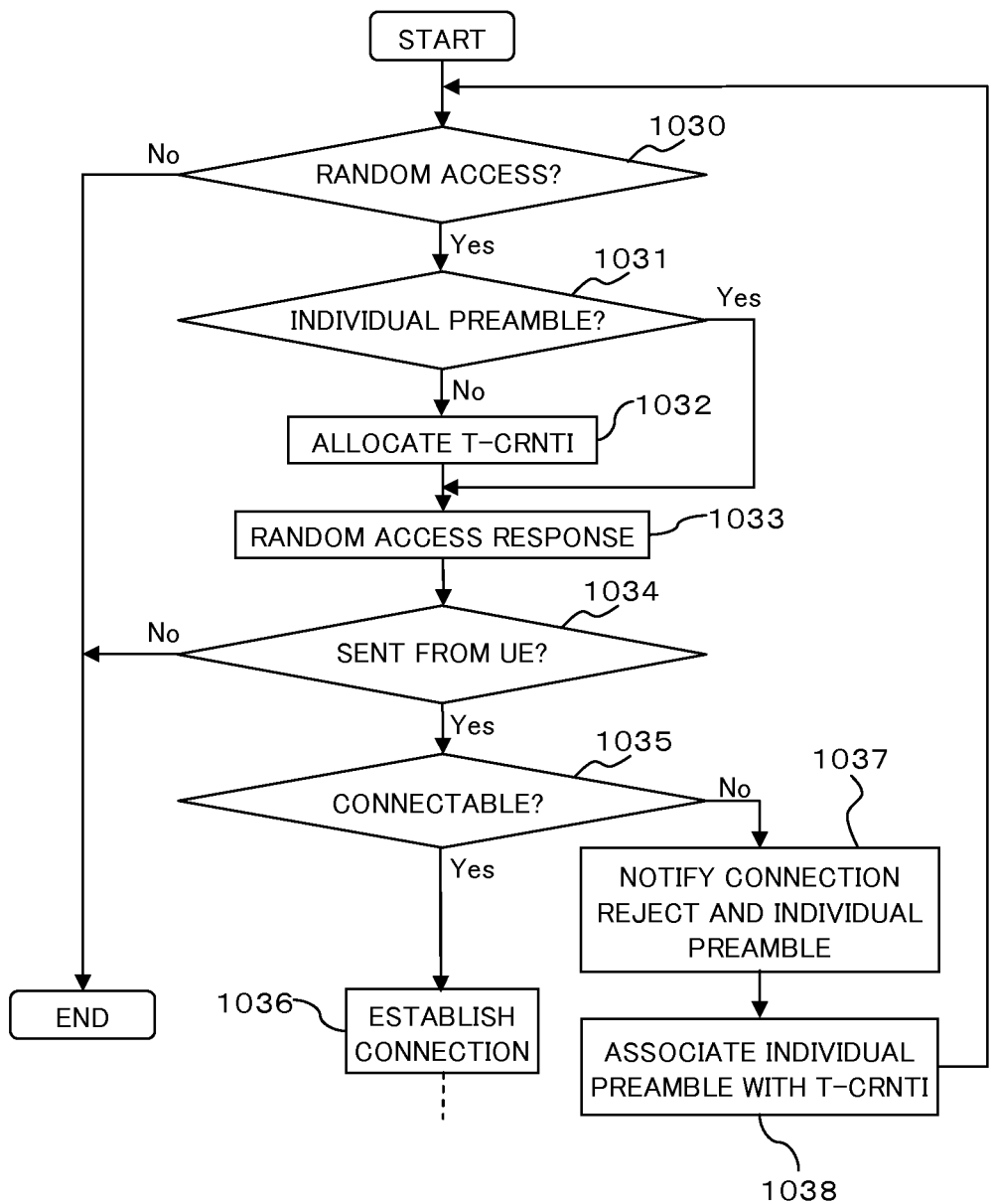
FIG. 9 is a flowchart illustrating one example of an RA procedure taken by an eNB in a third embodiment.
Figure 10:
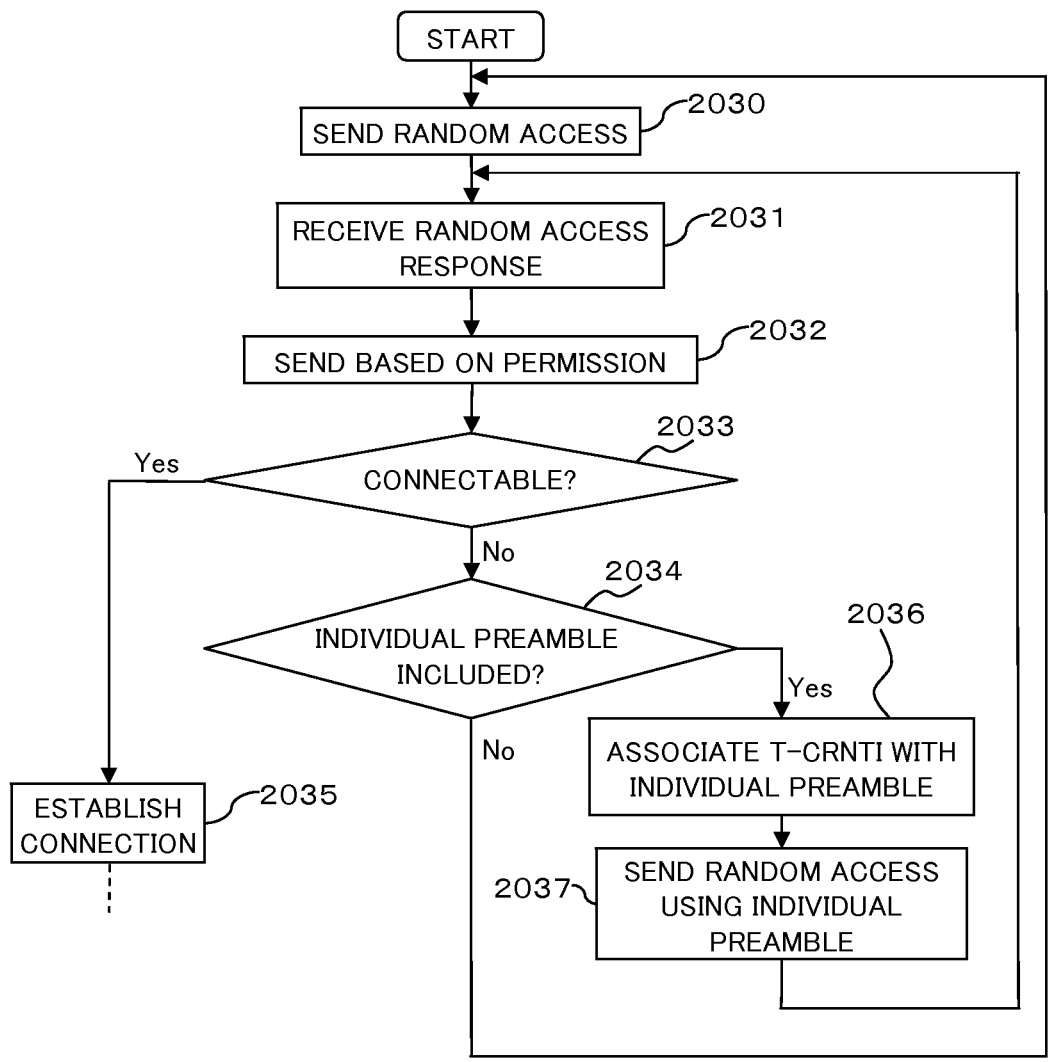
FIG. 10 is a flowchart illustrating one example of an RA procedure taken by a UE in the third embodiment.

The example of the operation of the eNB 10 in this example is depicted in FIG. 9, and the example of the operation of the UE 20 is depicted in FIG. 10.

As illustrated in FIG. 10, for executing a contention based RA procedure, the UE 20 (the communication management section 244) randomly selects a signature from signatures maintained in the preamble management section 242, and sends the selected signature to the eNB 10 through an RACH as an RA preamble (Msg1) (Processing 2030).

On the other hand, the eNB 10 (communication management section 144) is periodically monitoring whether any RA preamble (Msg1) sent by the UE 20 is received (No route from Processing 1030), as illustrated in FIG. 9. Once a reception of the RA preamble (Msg1) is identified (Yes route from Processing 1030), the communication management section 144 in the eNB 10 checks whether or not the received RA preamble (signature) is an individual signature, in cooperation with the preamble management section 242 (Processing 1031).

If the received signature is not an individual signature (No route from Processing 1031), the communication management section 144 in the eNB 10 allocates T-CRNTI (s) to one or more UEs 20 that could be identified, in cooperation with the RNTI management section 141 (Processing 1032).

The eNB 10 (the communication management section 144) then generates an RA response (Msg2) for the RA preamble (Msg1) received from the identified UE 20, and sends the response to the UE 20 (Processing 1033). In this RA response, contained may be one or more signatures that the eNB 10 (the communication management section 144) could identify, transmission grants for shared UL channels corresponding to the signatures, and a T-CRNTI, for example.

In response to receiving the RA response (Msg2) from the eNB 10 (Processing 2031), the UE 20 (the communication management section 244) checks whether or not the signature that was sent in the RA preamble (Msg1) is contained in the received information, as illustrated in FIG. 10. When it is contained, the UE 20 (the communication management section 244) sends (scheduled transmission) a UL message (Msg3) based on the transmission grant that is contained in the RA response (Msg2) and corresponds to the signature which the UE sent (Processing 2032). In this message (Msg3), contained may be a TMSI, as one example of the identification number of the UE 20.

On the other hand, after sending the RA response (Msg2), the eNB 10 (communication management section 144) is monitoring whether any Msg3 is received from the UE 20 (No route from Processing 1034), as illustrated in FIG. 9. If a reception of an Msg3 is identified (Yes route from Processing 1034), the eNB 10 (the communication management section 144) checks whether or not a connection can be made (a link can be established) with the UE 20 indicated by the TMSI included in this Msg3 (Processing 1035).

For example, when the congestion monitor section 143 determines that no congestion occurs, the eNB 10 (the communication management section 144) determines that a connection can be made and generates and sends a response (Msg4: Contention Resolution) for the Msg3 to the UE 20.

In response to receiving this response (Msg4), the UE 20 continues the communication with the eNB 10. The UE 20 uses the T-CRNTI described above as a cell-RNTI (C-RNTI) in subsequent communications with the eNB 10. Thereby, a connection between the eNB 10 and the UE 20 is established (Yes route from Processing 1035 through Processing 1036 in FIG. 9; and Yes route from Processing 2033 through Processing 2035 in FIG. 10).

On the other hand, as illustrated in FIG. 9, if the eNB 10 (the congestion monitor section 143) recognizes occurrence of congestion, the eNB 10 (the communication management section 144) determines that a connection cannot be made and sends (notification) an RRC connection reject (Msg4) and the individual signature to that UE 20 (Processing 1037). In addition, the communication management section 144 maintains the individual signature and T-CRNTI allocated in the above Processing 1032, by relating them to each other, in cooperation with the RNTI management section 141 and the preamble management section 142 (Processing 1038).

In response to receiving the Msg4, the UE 20 (the communication management section 244) checks whether or not the individual signature is contained in this Msg4 (No route from Processing 2034), as illustrated in FIG. 10. If an individual signature is contained (Yes route from Processing 2034), the communication management section 244 maintains this individual signature and the T-CRNTI received in the response (Msg2), by relating them to each other, in cooperation with the RNTI management section 241 and the preamble management section 242 (Processing 2036).

The UE 20 (the communication management section 244) then makes a random access to the eNB 10 again using the individual signature notified in the Msg4 (Processing 2037). More specifically, the UE 20 (the communication management section 244) makes an RA in accordance with a non-contention based RA procedure (sends an RA preamble containing the individual signature to the eNB 10).

Once this RA preamble (individual signature) is successfully received and identified by the eNB 10 (the communication management section 144), the communication management section 144 generates an RA response (Msg2) for the individual signature without reallocating a T-CRNTI, and send the response to the UE 20 (Yes route from Processing 1031 to Processing 1033 in FIG. 9). In this RA response, contained may be a transmission grant for the shared UL channel corresponding to this individual signature, for example.

Thereafter, the UE 20 (the communication management section 244) executes Processing 2031 through Processing 2033 illustrated in FIG. 10, and establishes a connection with the eNB 10 by receiving a response (Msg4) indicating that a connection can be made from the eNB 10 (Yes route from Processing 2033 to Processing 2035). The UE 20 uses the related T-CRNTI described above as a cell-RNTI (C-RNTI) in subsequent communications with the eNB 10.

As set forth above, in accordance with this example, during a contention based RA procedure, a T-CRNTI allocated to a UE 20 is related to an individual signature allocated to that UE 20 for retrying an RA in the non-contention based RA procedure. Accordingly, no reallocation of a T-CRNTI (C-RNTI) may be required to the UE 20 upon retrying an RA, and the time to initiate a communication can be reduced.

(4) Fourth Embodiment

As set forth above, 6-bit signatures (64 different signatures) are supplied for an RA in the LTE, which are shared between contention based and non-contention based RAs. Since individual signatures are limited, minimizing long-term occupation of a particular individual signature by a particular UE 20 is preferred.

For this purpose, a limit of validity may be set to an individual signature allocated by the eNB 10 to a UE 20 as described above for the UE 20 retrying an RA in accordance with a non-contention based RA procedure. This limit of validity may be a fixed value or a variable. In the case of a valuable, the variable limit of validity may be notified to the UE 20 by including the value in an RRC connection reject (Msg4) together with an individual signature. The limit of validity is maintained in the preamble management section 142 in the eNB 10, and in the preamble management section 242 in a UE 20, for example.

Figure 11:
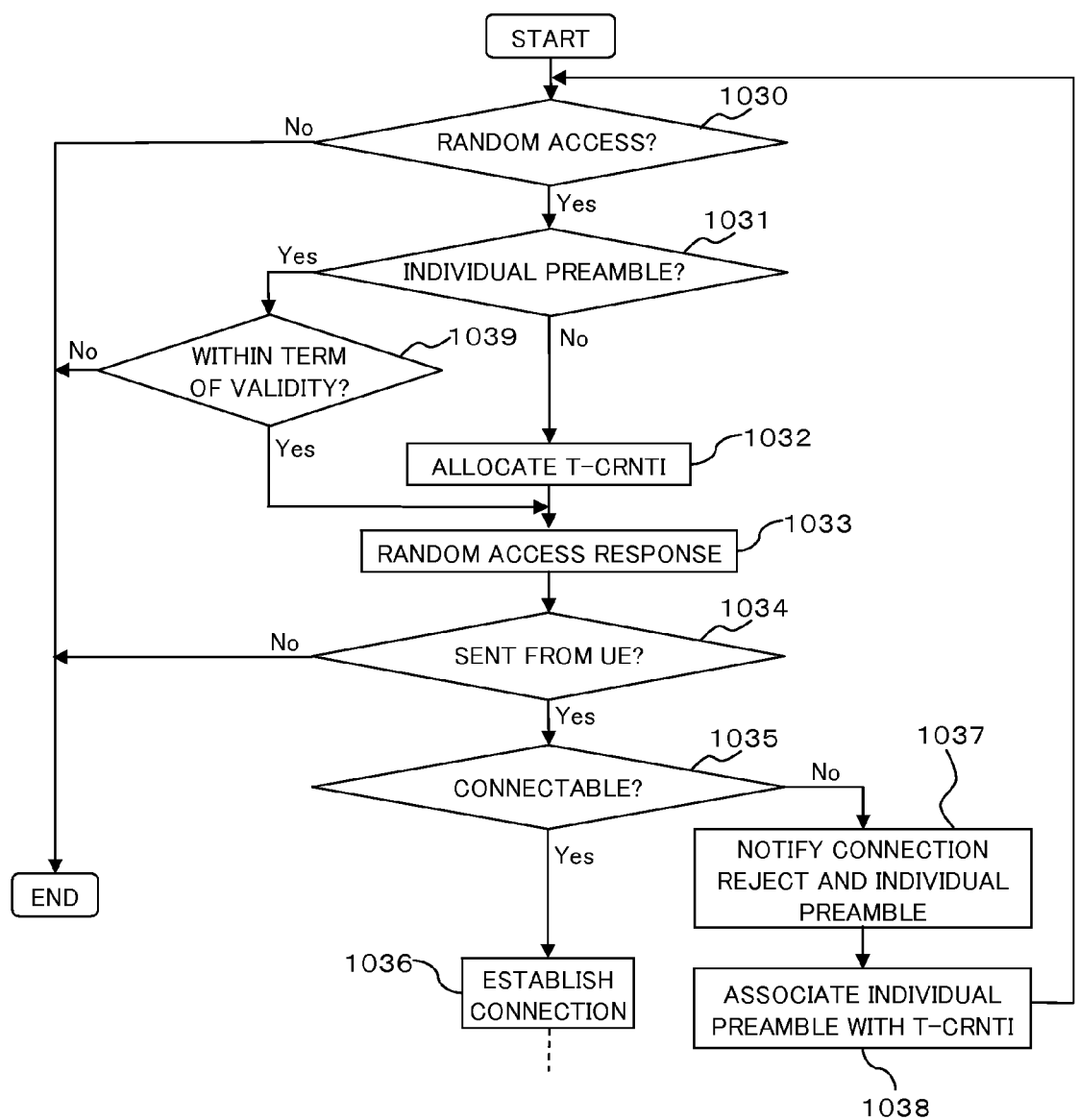
FIG. 11 is a flowchart illustrating one example of an RA procedure taken by an eNB in a fourth embodiment.
Figure 12:
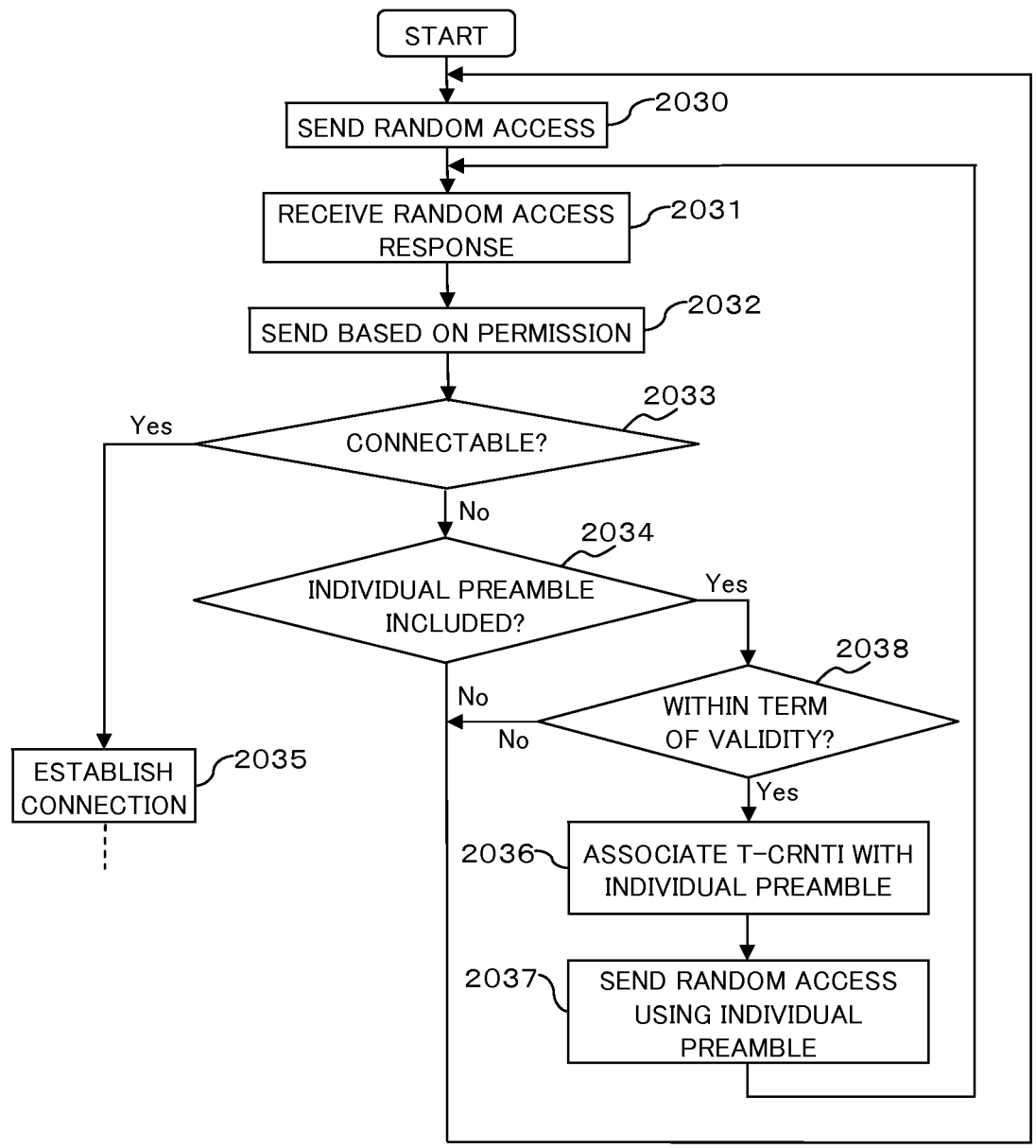
FIG. 12 is a flowchart illustrating one example of an RA procedure taken by a UE in the fourth embodiment.

The example of the operation of the eNB 10 in this example is depicted in FIG. 11, and the example of the operation of the UE 20 is depicted in FIG. 12. As can be noticed when comparing FIG. 12 with FIG. 10, and FIG. 11 with FIG. 9, respectively, Processing 2038 is introduced for a UE 20 (the communication management section 144) and Processing 1039 is introduced for the eNB 10 (the communication management section 144).

More specifically, as illustrated in FIG. 12, when an individual signature is contained in an Msg4 (RRC connection reject) received from the eNB 10 (when "Yes" in Processing 2034), the UE 20 (the communication management section 244) executes the above-described Processing 2036 and Processing 2037 only when the limit of validity does not pass (during "Yes" in Processing 2038). More specifically, the UE 20 relates the individual signature allocated from the eNB 10 to the T-CRNTI, and sends its own individual signature (retries an RA in accordance with the non-contention based RA procedure). If the individual signature expires, the UE 20 (the communication management section 244) waits for receiving an RA response (Msg2) from the eNB 10 (No route from Processing 2038).

On the other hand, as illustrated in FIG. 11, only when a valid individual signature (RA preamble) is received from the UE 20, the eNB 10 (the communication management section 144) generates and sends an RA response (Msg2) for the individual signature (Processing 1031, and Yes route from Processing 1039 to Processing 1033). When the received individual signature expires, the eNB 10 (the communication management section 144) waits for receiving another RA preamble (No route from Processing 1039). The expired individual signature can be allocated to other UEs 20.

As set forth above, by setting a limit of validity by the eNB 10 to an individual signature allocated to a UE for retrying an RA in accordance with a non-contention based RA procedure, effective utilization of the signatures can be enhanced.

(5) Fifth Embodiment

When a UE 20 tries to resume a communication, such as a UL data transmission, with the eNB 10 that has been interrupted, in order for the UE 20 to make a UL transmission to the eNB 10, a wireless resource is allocated to the UE 20 for making such a UL transmission request. In such a case, when a UE 20 is notified of an RRC connection reject (Msg4) in a contention based RA procedure, the UE 20 can establish a connection with a shorter delay if the UE 20 can resume the processing from the step subsequent to the interrupted step, than in the case where the UE 20 executes an RA procedure from the beginning (i.e., transmits an Msg1).

Figure 13:
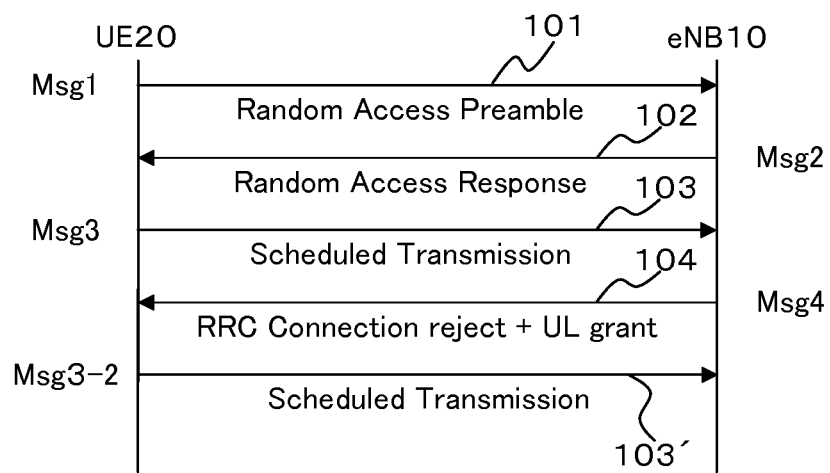
FIG. 13 is a sequence diagram illustrating one example of an RA procedure taken by a wireless communication system in a fifth embodiment.

An RA sequence as one example of such a case is illustrated in FIG. 13. As illustrated in FIG. 13, upon notifying a UE 20 of a RRC connection reject (Msg4) (Processing 104), the eNB 10 (the communication management section 144) includes allocation information (transmission grant: UL Grant) of the wireless resource used for a UL transmission request in an Msg4. Information related to when an RA (UL transmission) is to be retried (waiting time duration) may be contained in this message.

This enables the UE 20 (the communication management section 244) to make an UL transmission (transmission of an Msg3-2 equivalent to Msg3) based on the transmission grant notified in the Msg4 after a certain time duration associated with the waiting time duration, using wireless resource allocated in the allocation information (Processing 103'). More specifically, a UE that was identified by the eNB 10 but a connection therewith was rejected or suspended for some reason of the eNB 10 can retry an RA, not from transmission of an RA preamble (Msg1) (Processing 101), but from a UL transmission based on the UL transmission grant (corresponding to Processing 103 to send an Msg3).

Figure 14:
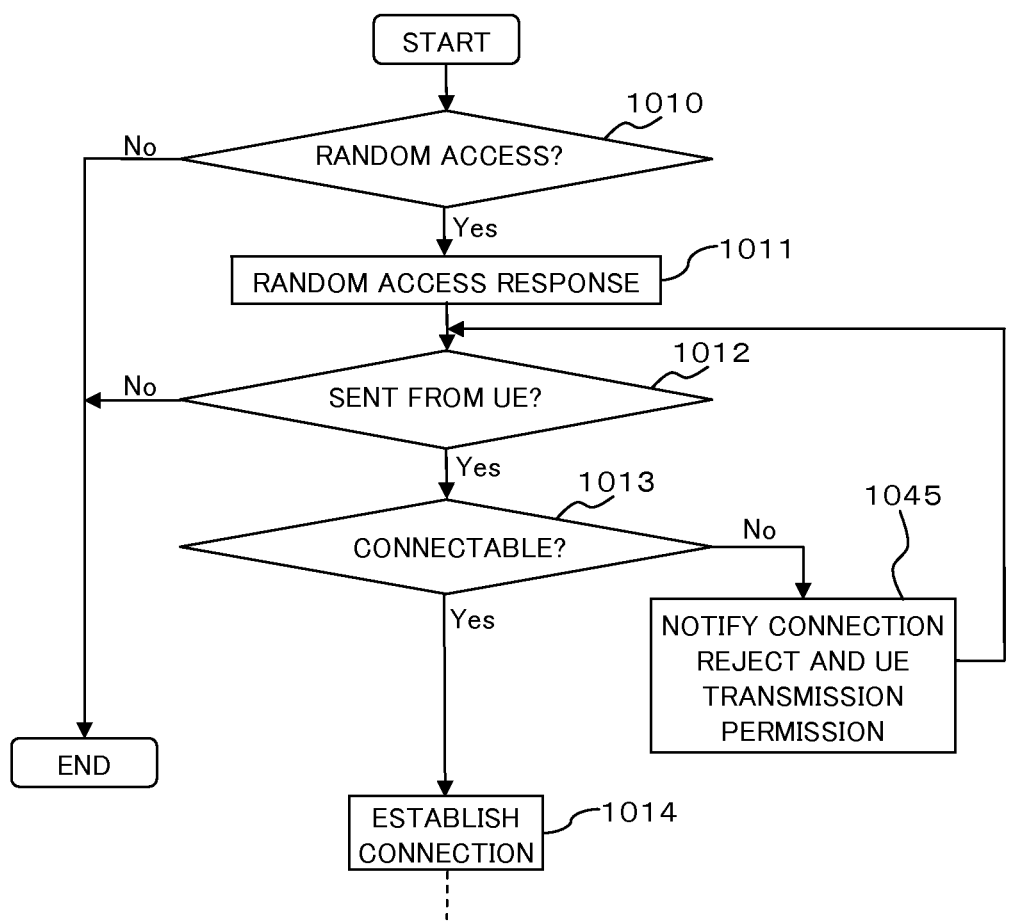
FIG. 14 is a flowchart illustrating one example of an RA procedure taken by an eNB in the fifth embodiment.
Figure 15:
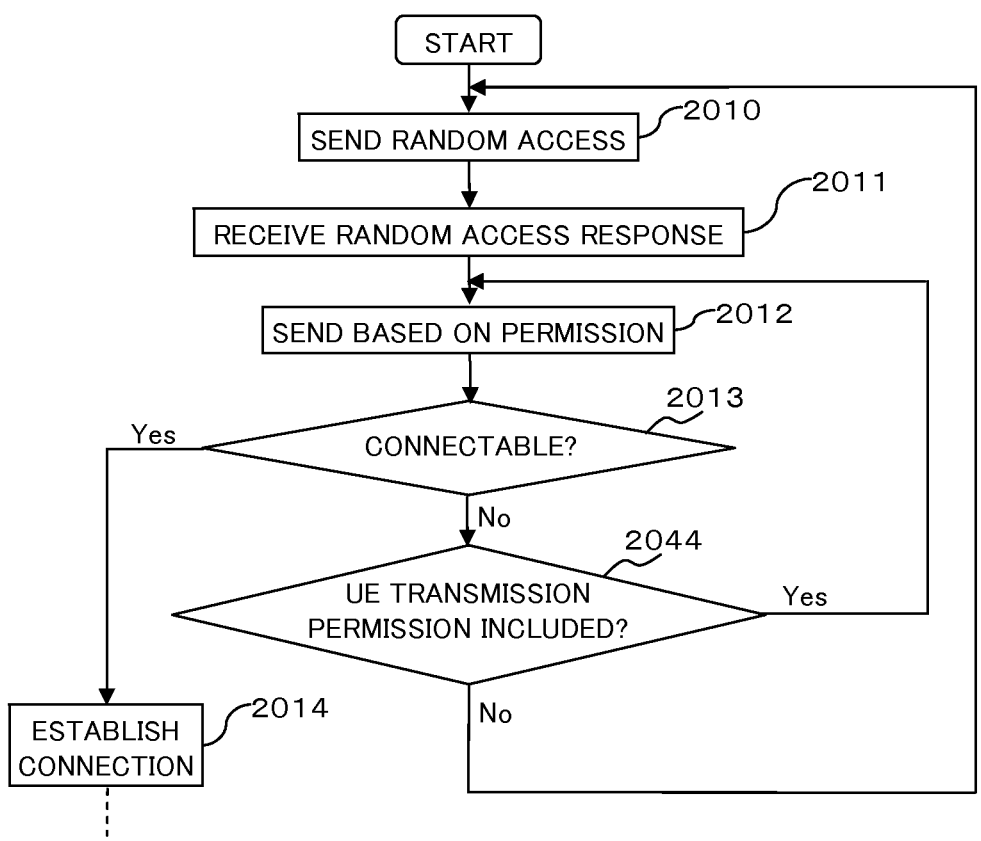
FIG. 15 is a flowchart illustrating one example of an RA procedure taken by a UE in the fifth embodiment.

The examples of operations of the eNB 10 and a UE 20 executing such an RA sequence are illustrated in FIGS. 14 and 15, respectively. Note that Processing 1010 through Processing 1014 executed by the eNB 10 (the communication management section 144) illustrated in FIG. 14 is equivalent to Processing 1010 through 1014 illustrated in FIG. 5. In addition, Processing 2010 through Processing 2014 executed by the UE 20 (the communication management section 244) illustrated in FIG. 15 is equivalent to Processing 2010 through 2014 illustrated in FIG. 6.

As illustrated in FIG. 14, upon notifying a UE 20 of a RRC connection reject (Msg4) (Processing 104), the eNB 10 (the communication management section 144) includes a transmission grant (UL Grant) for a UL transmission request in the Msg4 and sends the message to the UE 20 (No route from Processing 1013 to Processing 1045). Thereafter, the eNB 10 (the communication management section 144) waits for receiving a UL transmission (Msg3) from the UE 20 based on the UL Grant.

On the other hand, as illustrated in FIG. 15, in response to receiving the RRC connection reject (Msg4) from the eNB 10, the UE 20 (the communication management section 244) checks whether or not a UL Grant is contained in this Msg4 (Processing 2044).

If a UL Grant is contained in the received Msg4, the UE 20 (the communication management section 244) makes a UL transmission (Msg3) based on the UL Grant (Yes route from Processing 2044 to Processing 2012). If no UL Grant is contained in the received Msg4, the UE 20 (the communication management section 244) resends an RA preamble (random signature) in accordance with a contention based RA procedure (No route from Processing 2044 to Processing 2010).

While waiting for receiving a UL transmission (Msg3), when an Msg3 is received and a connection can be made (no congestion occurs), the eNB 10 (the communication management section 144) sends, to that UE 20, a message (Msg4: Contention Resolution) indicating a connection grant, and establishes a connection with the UE 20 (Processing 1012, and Yes route from Processing 1013 to Processing 1014).

As set forth above, in accordance with this example, a UE 20 that was identified by the eNB 10 but a connection therewith was rejected or suspended for some reason of the eNB 10 can retry an RA from an intermediate step (transmission equivalent to an Msg3), rather than from the beginning of a contention based RA procedure. Accordingly, the time to establish a connection can be reduced.

(6) Sixth Embodiment

As set forth above, since signatures available for RAs are limited, minimizing repeatedly making RAs by a UE 20 is desirable. In addition, after the eNB 10 sent an RRC connection reject (Msg4), the congestion is eliminated and the eNB 10 may send an Msg4 indicating a connection grant.

Figure 16:
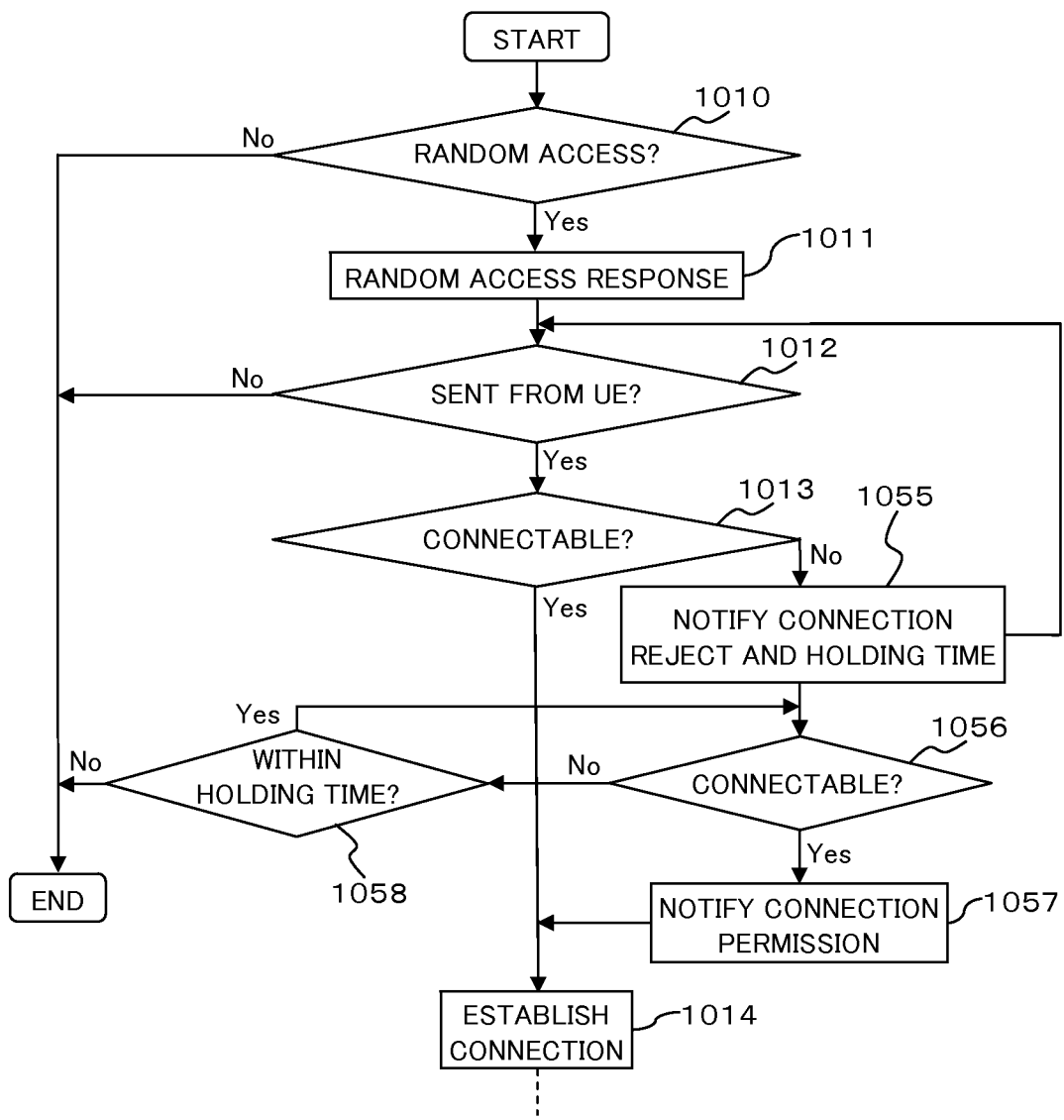
FIG. 16 is a flowchart illustrating one example of an RA procedure taken by an eNB in a sixth embodiment.

Accordingly, in this example, upon notifying a UE 20 of a RRC connection reject (Msg4) (Processing 104), the eNB 10 (the communication management section 144) includes information relating to the waiting time duration (holding time duration) until an Msg4 is to be resent (No route from Processing 1013 to Processing 1055 in FIG. 16). The holding time duration may be set to a time duration within one microseconds, for example.

Figure 17:
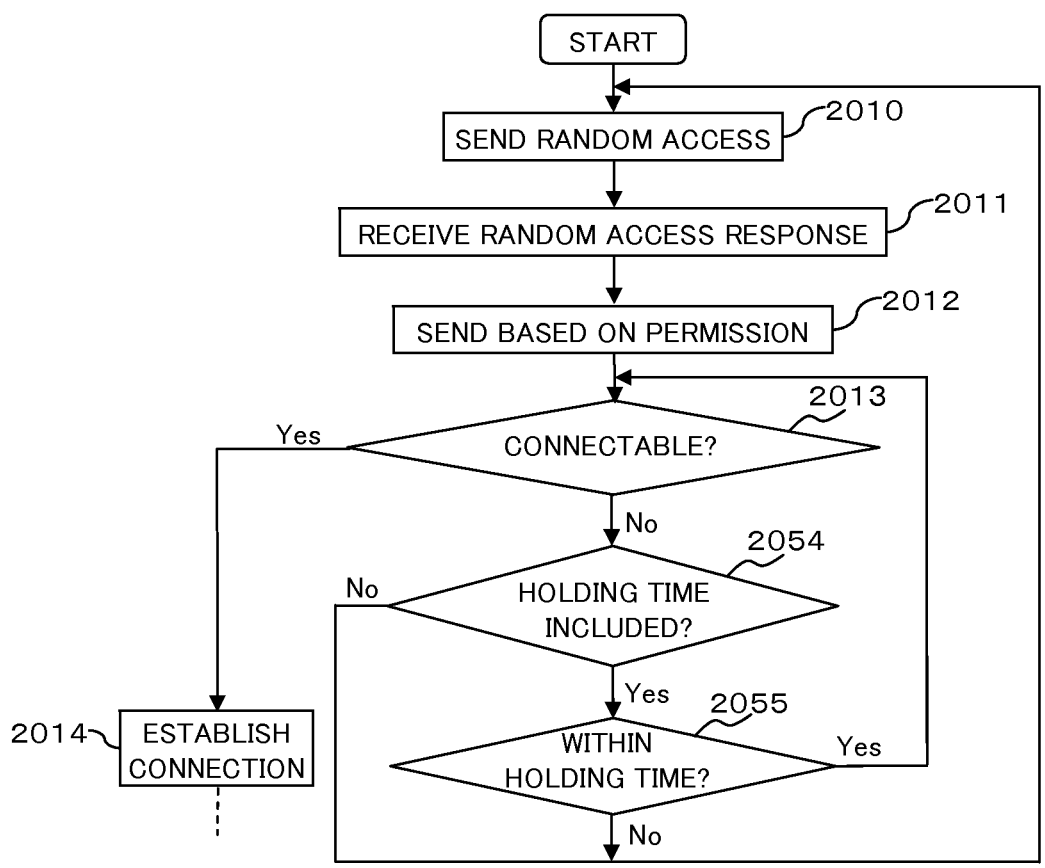
FIG. 17 is a flowchart illustrating one example of an RA procedure taken by a UE in the sixth embodiment.

When the UE 20 (the communication management section 244) receives an RRC connection reject (Msg4) including a holding time duration (information related thereto) from the eNB 10 (No route from Processing 2013 in FIG. 17), the UE 20 waits until the holding time duration expires since there is a possibility of another Msg4 being resent (Processing 2054, Yes route from Processing 2055 to Processing 2013 in FIG. 17).

On the other hand, as illustrated in FIG. 16, after notifying the UE 20 of the RRC connection reject (Msg4), the eNB 10 (the communication management section 144) monitors whether a connection can be granted or not until the holding time duration expires (until "No" in Processing 1058) (No route from Processing 1056 to Yes route from Processing 1058).

If a connection can be granted, the eNB 10 (the communication management section 144) sends, to that UE 20, an Msg4 indicating a connection grant (Yes route from Processing 1056 to Processing 1057), and establishes a connection with the UE 20 (Processing 1014).

However, if a connection still cannot be granted before the holding time duration expires, the eNB 10 (the communication management section 144) waits for receiving another RA (preamble) (Processing 1056 and No route from Processing 1058).

On the other hand, when an Msg4 is resent before the holding time duration expires, the UE 20 (the communication management section 244) continues an RA procedure in accordance with the content of the Msg4. If no holding time duration is contained in the RRC connection reject (Msg4) received from the eNB 10 or if no Msg4 is resent in the holding time duration, the UE 20 (the communication management section 244) retries an RA (Processing 2054, No route from Processing 2055).

Note that Processing 1010 through Processing 1014 executed by the eNB 10 (the communication management section 144) illustrated in FIG. 16 is equivalent to Processing 1010 through 1014 illustrated in FIG. 5. In addition, Processing 2010 through Processing 2014 executed by the UE 20 (the communication management section 244) illustrated in FIG. 17 is equivalent to Processing 2010 through 2014 illustrated in FIG. 6.

As set forth above, in accordance with this example, a UE 20 that was identified by the eNB 10 but a connection therewith was rejected or suspended can be prevented from executing RAs repeatedly since the UE 20 is forced to wait for receiving information (Msg4) for granting a connection for a predetermined time duration. Accordingly, effective utilization of signatures can be enhanced.

(7) Seventh Embodiment

Figure 18:
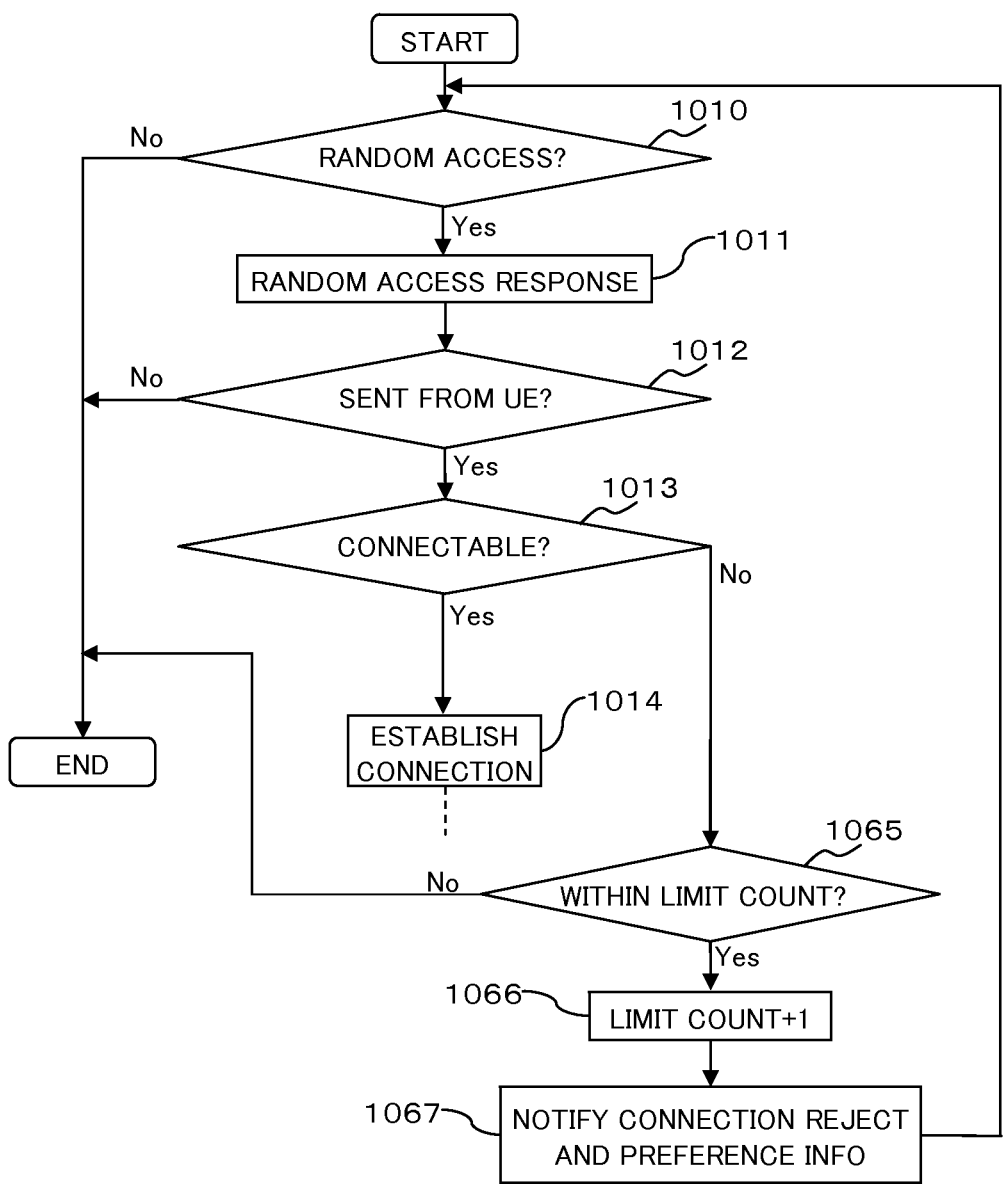
FIG. 18 is a flowchart illustrating one example of an RA procedure taken by an eNB in a seventh embodiment.

Retries of an RA by a UE 20 can be restricted to a certain number (upper limit). For example, in the context of the first embodiment, as illustrated in FIG. 18, the eNB 10 (the communication management section 144) counts up the counter every time the eNB 10 notifies a UE 20 of an RRC connection reject (Msg4). Only when the counter does not exceed its upper limit (limit count), the eNB 10 (the communication management section 144) sends a Msg4 attached with preference information (Yes route from Processing 1065 to Processing 1066 and 1067).

This can prevent the UE 20 from unnecessary repeating RAs.

Note that Processing 1010 through Processing 1014 executed by the eNB 10 (the communication management section 144) illustrated in FIG. 18 is equivalent to Processing 1010 through 1014 illustrated in FIG. 5. In addition the processing by the UE 20 is equivalent to Processing 2010 through Processing 2016 illustrated in FIG. 6.

(8) Others

The above-described embodiments may be combined where appropriate. For example, either or both of the sixth embodiment (setting the holding time duration) and the seventh embodiment (limiting the reexecution count) may be applied to any of first to fourth embodiments described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A connection processing method in a wireless communication system including wireless terminals and a wireless base station, the communication processing method comprising:
   at the wireless base station, if rejecting a connection from a wireless terminal, that makes a connection request in accordance with a first connection processing, in the case of not conflicting with other wireless terminals or in the case of having resolved conflict with other wireless terminals, controlling to adopt a second connection processing different from the first connection processing in response to a subsequent connection request by the wireless terminal, the connection request in the first connection processing including information that may conflict with a connection request by another wireless terminal, the connection request in the second connection processing including individual information allocated to the wireless terminal in the case of the rejecting, the individual information not conflicting with the connection request by the another wireless terminal, wherein
   the controlling comprises:
   storing an identifier allocated to the wireless terminal and the individual information, the individual information being associated with the identifier; and
   communicating with the wireless terminal using the identifier when a connection is established with the wireless terminal in accordance with the second connection processing.

2. The connection processing method according to claim 1, wherein
   the controlling comprises notifying the wireless terminal of information indicating that the second connection processing is available, and
   the wireless terminal executes the second connection processing using the notified information.

3. The connection processing method according to claim 1, wherein
   the controlling comprises notifying the wireless terminal of a term of validity of the individual information, and
   the wireless terminal executes the second connection processing using the individual information only during the term of validity.

4. The connection processing method according to claim 1, wherein the controlling comprises in the case of the rejecting, allocating, to the wireless terminal, a wireless resource and a transmission grant to be used for a connection request in the second connection processing.

5. The connection processing method according to claim 1, wherein the controlling comprises limiting execution of the second connection processing by the wireless terminal to a certain execution count.

6. A wireless base station in a wireless communication system including wireless terminals and the wireless base station, the wireless base station comprising:
   a control section that, if rejecting a connection from a wireless terminal, that makes a connection request in accordance with a first connection processing, in the case of not conflicting with other wireless terminals or in the case of having resolved conflict with other wireless terminals, controls to adopt a second connection processing different from the first connection processing in response to a subsequent connection request by the wireless terminal, the connection request in the first connection processing including information that may conflict with a connection request by another wireless terminal, wherein
   the control section:
   in the case of the rejecting, allocates, to the wireless terminal, individual information used by the wireless terminal for the connection request in the second connection processing, the individual information not conflicting with the connection request by the another wireless terminal;
   stores an identifier allocated to the wireless terminal and the individual information, the individual information being associated with the identifier; and
   controls a communication with the wireless terminal using the identifier when a connection is established with the wireless terminal in accordance with the second connection processing.

7. The wireless base station according to claim 6, wherein the control section notifies the wireless terminal of information indicating that the second connection processing is available.

8. The wireless base station according to claim 6, wherein in the case of the rejecting, the control section allocates, to the wireless terminal, a wireless resource and a transmission grant to be used for a connection request in the second connection processing.

9. A wireless terminal in a wireless communication system including wireless terminals and a wireless base station, the wireless terminal comprising:
   a control section that, if a connection is rejected by the wireless base station for a connection request in accordance with a first connection processing in the case of not conflicting with other wireless terminals or in the case of having resolved conflict with other wireless terminals, is controlled by the wireless base station to apply a second connection processing different from the first connection processing upon making a subsequent connection request to the wireless base station, wherein
   the control section:
   makes the connection request in the first connection processing using information that may conflict with a connection request by another wireless terminal, and makes the connection request in the second connection processing using individual information allocated to the wireless terminal in the case of the being rejected, the individual information not conflicting with the connection request by the another wireless terminal;
   stores an identifier allocated by the wireless base station and the individual information, the individual information being associated with the identifier; and
   communicates with the wireless base station using the identifier when a connection is established with the wireless base station in accordance with the second connection processing.

10. The wireless terminal according to claim 9, wherein the control section makes a connection request in the second connection processing based on a wireless resource and a transmission grant allocated, in the case of the being rejected, by the wireless base station to be used for a connection request in the second connection processing.

* * * * *